H. HATFIELD.
BEE-HIVE.

No. 184,778. Patented Nov. 28, 1876.

WITNESSES:
E. Wolff
A. F. Terry

INVENTOR:
H. Hatfield
BY Munn & Co
ATTORNEYS.

N. PETERS, PHOTO-LITHOGRAPHER, WASHINGTON, D. C.

UNITED STATES PATENT OFFICE.

HIRAM HATFIELD, OF OSSIAN, INDIANA.

IMPROVEMENT IN BEE-HIVES.

Specification forming part of Letters Patent No. 184,778, dated November 28, 1876; application filed August 21, 1875.

*To all whom it may concern:*

Be it known that I, HIRAM HATFIELD, of Ossian, in the county of Wells and State of Indiana, have invented a new and Improved Bee-Hive, of which the following is a specification:

The invention will first be described in connection with drawing, and then pointed out in the claims.

Figure 1:
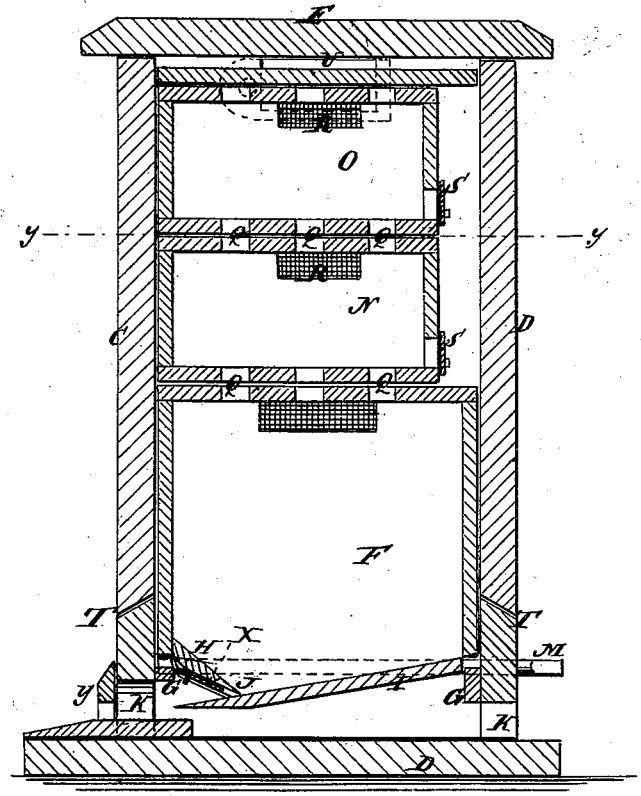
Figure 2:
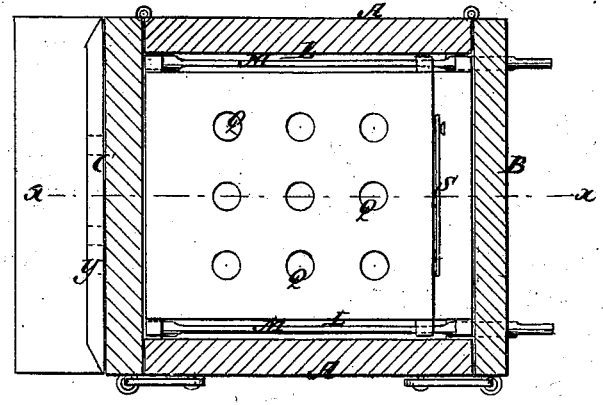

Figure 1 is a sectional elevation of my improved bee-hive, taken on the line $x\ x$ of Fig. 2; and Fig. 2 is a horizontal section taken on the line $y\ y$ of Fig. 1.

Similar letters of reference indicate corresponding parts.

A represents the sides, B the front, and C the back, of the outer case of the hive resting on the bottom board D, and having a top, E, permanently attached. F is the main portion of the hive, being an inner case, resting on cleats G on the front and back, and having its bottom composed of two sloping pieces, H I, one of which drops below the other sufficiently to make a suitable passage for the bees into the hive at J, but so that the passage cannot be gained by the crawling bee-moths. The bees have entrance through the outside case at K to this passage. It may be closed by a slide, X, and the passages K may be partially closed by detachable gate Y. The hive F fills the outside case between the front and back, but is narrower the other way to make ventilating-spaces L, in which dampers M are arranged to shut off the air; also, to cut off the passage into the upper part of the outside case when the honey-boxes are to be changed.

N and O represent honey boxes or drawers, located above the hive F, and resting on it. They have openings Q, registering with each other, and with the similar openings in the top of the main hive F, when the drawers are suitably adjusted therefor to allow the bees free passage into and out of the boxes. R represents ventilators on the main hive and honey-boxes, protected by wire-gauze covers; U, ventilators for the outside box, and S gates to open for the inspection of the honey-boxes, and for the escape of the bees at certain times.

The front and back, B C, are hinged above the bevel-slit T, to be opened for inspection of the hive, and for removing the filled honey-boxes.

When the hive is set the upper honey-box will be shifted along to the right to cut off passage from the box below, so that it will be filled first. To remove it when filled, it will be shoved to the right to cut off the passages Q, and left to stand a day with the gate S open. The bees in it will then pass out through the gate, and, one of the sides or doors A to be left open, into the main hive, in which they may be confined by closing the passages K, and shutting the dampers' M early in the morning before their time to go out; then, on opening one of the doors, the filled box may be shifted to the upper position, and the empty one to the lower place to be filled. The filled one may then be left undisturbed till the lower one is found to contain the necessary winter's supply, when the filled one may be removed without robbing the bees too much; or, if taken out before, it may be readily returned in case too little is found in the lower case at the close of the season.

Having thus described my invention, I claim as new and desire to secure by Letters Patent—

1. The boxes O N, communicating by corresponding apertures, and the upper boxes made movable, as shown and described, whereby any two boxes may be made to register, or otherwise to open or close their communication.

2. The inclined bottom, arranged with respect to reverse incline H J and bee-entrance K, as and for the purpose specified.

HIRAM HATFIELD.

Witnesses:
DAVID ZEGENFUS,
LUMLEY F. WILSON.